(12) United States Patent
Rivard et al.

(10) Patent No.: US 8,220,002 B2
(45) Date of Patent: Jul. 10, 2012

(54) ISOLATION OF USER-INTERACTIVE COMPONENTS

(75) Inventors: John J Rivard, Redmond, WA (US);
David Paul Hill, Redmond, WA (US);
Niklas Gustafsson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1203 days.

(21) Appl. No.: 12/020,344

(22) Filed: Jan. 25, 2008

(65) Prior Publication Data
US 2009/0193434 A1 Jul. 30, 2009

(51) Int. Cl.
*G06F 3/00* (2006.01)
*G06F 7/00* (2006.01)

(52) U.S. Cl. ............... 719/310; 715/700; 707/792
(58) Field of Classification Search .......... 719/310; 715/700; 707/792
See application file for complete search history.

(56) References Cited

U.S. PATENT DOCUMENTS

| | | | |
|---|---|---|---|
| 6,091,422 A | 7/2000 | Ouaknine et al. | |
| 6,147,687 A | 11/2000 | Wanderski | |
| 6,272,556 B1 | 8/2001 | Gish | |
| 6,300,946 B1 | 10/2001 | Lincke et al. | |
| 6,650,342 B1 | 11/2003 | Lim | |
| 6,708,334 B1 | 3/2004 | deCarmo et al. | |
| 6,944,644 B2 | 9/2005 | Gideon | |
| 7,502,843 B2* | 3/2009 | Kirstein et al. | 709/223 |
| 7,895,599 B2* | 2/2011 | Muscarella | 719/313 |
| 2003/0023700 A1* | 1/2003 | Swinton et al. | 709/208 |
| 2003/0078956 A1 | 4/2003 | Ravichandran et al. | |
| 2006/0225127 A1 | 10/2006 | Roberts et al. | |
| 2007/0061495 A1 | 3/2007 | Cummins et al. | |
| 2008/0240096 A1* | 10/2008 | Botha et al. | 370/390 |

OTHER PUBLICATIONS

Fabio Vignoli, A music retrieval system based on user-driven similarity and its evaluation, 2005.*
Krisz Flautner, et al. Thread level parallelism of desktop applications, Jan. 2, 2000. citeseer.ist.psu.edu/cache/papers/cs/11631/http:zSzzSzwww.eecs.umich.eduzSz~tnmzSzpaperszSzthreads.pdf/flautner00thread.pdf. Last accessed Oct. 19, 2007, 9 pages.
Sal Razzaq. Microsoft Composite Application Block (CAB), version 0.92, Mar. 2007. www.razzaq.org/pub/framework_composite_application_block.pdf. Last accessed Oct. 19, 2007, 49 pages.
Alexander Ya-Li Wong, et al. Operating System Support for Multi-User, Remote, Graphical Interaction //citeseer.ist.psu.edu/rd/1634186%2C524810%2C1%2C0.25%2CDownload/http://citeseer.ist.psu.edu/compress/0/papers/cs/26299/ftp:zSzzSzftp.deas.harvard.eduzSztechreportszSztr-14-99.ps.gz/operating-system-support-for.ps. Last accessed Oct. 19, 2007, 13 pages.

* cited by examiner

*Primary Examiner* — Lechi Truong
(74) *Attorney, Agent, or Firm* — Workman Nydegger (57) ABSTRACT

The isolation of user-interactive components form the logical components of an exemplary computing application environment is provided. In an illustrative implementation, an exemplary computing application environment comprises one or more user interface (UI) elements that run on an exemplary user-interface processing thread and application logic that illustratively operatively runs asynchronously on at least one other processing thread. In an illustrative implementation an isolation boundary is provided between an exemplary user interface and the application logic of the exemplary computing application environment. In the illustrative implementation, the isolation boundary can comprise an asynchronous view contract comprising a channel between an exemplary view layer of an exemplary user interface (e.g., one or more user-interactive components) and application logic.

5 Claims, 10 Drawing Sheets

ISOLATION OF USER-INTERACTIVE COMPONENTS

BACKGROUND

Generally, client-based computing applications can include user-interface (UI) components that are user-interactive. Some of the interactive features can include, editable text, buttons, menus, and controls. Commonly deployed UI implementations are single-threaded and are event driven. With current implementations, a message pump can be used to manage input from one or more cooperating UI elements and can operate to dispatch events to application code to execute one or more desired operations and features (e.g., printing). The events are typically low-level keyboard and mouse interactions with the UI element. Generally in such environments, it is typical that application process of a UI event can trigger application logic that runs on the same processing thread as is processing the UI interactions. In practice, the processing of input events (e.g., interactions with a user interface) can take a perceptible amount of time, making the user interface non-responsive.

For example, a computing application may contain a user interface providing users with the ability to request various operations/features such as printing a file, saving a file, opening a file, and/or importing a file. In a contemplated example, a user can interact with the user interface to request the printing of a particular page. Generally, the processing thread that processes the printing request is the same as the one managing the user interactions—i.e., the UI thread. With current single thread or non-isolated UI thread based applications, there can exist a noticeable latency in the availability of UI functions and operations since the same thread controlling the UI is being used to process the requested application feature/operation. In this context, the application typically operates to prevent the UI from accepting additional inputs until the requested operation/feature (e.g., printing) is completely processed. Such latency can dramatically impact the usability of a given computing application and detract from a user's positive experience of a given computing application.

Form the foregoing it is appreciated that there exists a need for systems and methods to ameliorate the shortcomings of existing practices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The subject matter described herein allows for the isolation of user-interactive components form the logical components of an exemplary computing application environment having one or more user-interactive components. In an illustrative implementation, an exemplary computing application environment comprises one or more user interface (UI) elements that run on an exemplary user-interface processing thread and application logic that illustratively operatively runs asynchronously on at least one other processing thread.

In an illustrative implementation an isolation boundary is provided between an exemplary user interface and the application logic of the exemplary computing application environment. In the illustrative implementation, the isolation boundary can comprise an asynchronous view contract comprising a channel between an exemplary view layer of an exemplary user interface (e.g., one or more user-interactive components) and application logic.

In an illustrative operation, the exemplary view contract can operate to prescribe one or more asynchronous request objects operative to encapsulate one or more requirements for data isolation, asynchronous communications, and asynchronous message correlation as part of an exemplary messaging architecture allowing send and received-callback events between cooperating UI and logic components of an exemplary computing application environment.

The following description and the annexed drawings set forth in detail certain illustrative aspects of the subject matter. These aspects are indicative, however, of but a few of the various ways in which the subject matter can be employed and the claimed subject matter is intended to include all such aspects and their equivalents.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative illustrations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.
Isolating User-Interface Component Processing:

In an illustrative implementation, user interface (UI) elements can be isolated from an exemplary computing application's logic, such that the UI elements run on an exemplary UI thread and, illustratively, application logic runs asynchronously on a non-UI processing thread (e.g., on another thread or in an isolated memory region or another process). In the illustrative implementation, an operatively deployed protocol can exist between the UI layer and the application logic layer to define an illustrative isolation boundary. Additionally, the operatively deployed protocol can employ an abstract view of the UI layer as compared to conventional approaches which consider low-level keyboard and mouse input events since many of UI events operatively require a synchronous response on the UI thread.

The isolation boundary can illustratively comprise an asynchronous view contract. This is an asynchronous, channel between the view layer and the application logic. The contract ensures that the state managed each layer is discrete so that data-race conditions cannot arise between the view layer and the application logic.

In traditional object-oriented systems, isolation is difficult to achieve because standard object-oriented techniques favor synchronous interoperation across methods and properties that exchange references to objects that are shared by both the sender and the receiver.

In an illustrative operation, the use of an exemplary view contract ameliorates that shortcomings of existing practices by prescribing a set of asynchronous request objects that encapsulate the requirements for data isolation, asynchronous communications, and asynchronous message correlation to facilitate isolation of user-interface component processing from application logic processing.

In an illustrative implementation, the view contract comprises one or more of the following mechanisms: a description of the data and operations that the view layer (e.g., UI components) can request; a mechanism for synchronization of the data between both sides of the contract (i.e., between the view layer and the application logic layer); a mechanism for the view layer to asynchronously invoke application logic; a mechanism for sending and correlating messages sent from the view layer; and a mechanism for ensuring by-value or immutable messages (i.e., messages being communicated between the view layer and the application logic layer).

In the illustrative implementation, the view contract can be implemented by the logic layer. The implementation can be a standard interface (e.g., a message pump) or Web Service contract. It is appreciated that the communication mechanism for talking to the view contract can comprise various conventional application messaging architectures and is not limited to any illustratively described architectures and/or methods.

In an illustrative operation, the view contract can be reflected to the view layer via a set of request objects that encapsulate the mechanisms for asynchronous communications, message correlation, data serialization, and immutability.

In an illustrative implementation, a request object can encapsulate a single operation on the view contract. In the illustrative implementation, the request object can be considered to be a type of proxy for the contract operation. In an illustrative operation, the request object can exist in the same memory and on the same thread as the UI elements in the view layer. In the illustrative implementation, there can be one request object for each message or operation on the view contract. Additionally, in the illustrative implementation, a view contract can be described as a set or request objects.

In the illustrative operation, a request object can invoke a single operation on the view contract, can keep track of outstanding requests, and can cancel an outstanding request. Canceling a request simply means that any response received by the application logic will be ignored. It doesn't guarantee that the operation will be canceled or rolled back from in the application logic layer.

In an illustrative deployment, the request object can appear as local, synchronous components of the UI layer that can be used for local data binding and command invocation, using a familiar pattern of methods, properties, and events. Illustratively, the UI layer can freely request data and invoke operations on the application logic, and can easily track which operations are outstanding and are cancelable.

In an illustrative operation as part of an exemplary application messaging architecture, the set of members on a request object can illustratively operatively be deployed such the method signature is split into two—and outgoing "Send" method and an incoming "Received" event. Illustratively, the signature of the "Send" method has the same parameters but returns void. The signature of the "Received" event has the original return type as the incoming parameter. In addition, the request object can maintain the state of whether an existing pending operation is outstanding and a method for canceling a pending operation.

In an illustrative deployment, i.e., from the perspective of cooperating application logic, an exemplary view contract can be expressed as:

```
interface MyViewContract
{
    T RequestData( );
    bool ValidateData(T data);
    void UpdateData(T data);
    R InvokeFunc(T arg1, T arg2);
}
```

In the illustrative deployment, the resulting asynchronous view contract, i.e., from the perspective of the view layer can be expressed as a series of request objects that implement the interface for the matching operation on the view contract. In the illustrative deployment, the resulting asynchronous view contract can be expressed as:

```
delegate void ReceivedEvent( );
delegate void ReceivedEvent<T>(T result);
interface CancelableRequest {
    bool IsPending { get; }
    void Cancel( );
}
interface MyViewContract_RequestData : CancelableRequest {
    void Send( );
    event ReceivedEvent<T> Received;
}
interface MyViewContract_ValidateData : CancelableRequest {
    void Send(T data);
    event ReceivedEvent Received;
}
interface MyViewContract_UpdateData : CancelableRequest {
    void Send(T data);
    event ReceivedEvent Received;
}
interface MyViewContract_InvokeFunc : CancelableRequest {
    void Send(T arg1, T arg2);
    event ReceivedEvent<R> Received;
}
interface MyViewContract_Async {
    MyViewContract_RequestData RequestData { get; }
    MyViewContract_ValidateData ValidateData { get; }
    MyViewContract_UpdateData UpdateData { get; }
    MyViewContract_InvokeFunc InvokeFunc { get; }
}
```

It is appreciated that illustrative implementations of the request objects and the asynchronous view contract object as described herein is merely illustrative and descriptive as other implementations are contemplated by the herein described systems and methods. Further it is appreciated that the implementation of the request objects and the asynchronous view contracts is dependent on the underlying UI infrastructure and asynchronous messaging system in use by an exemplary computing application.

In an illustrative implementation, request objects are not operative to attempt to correlate or orchestrate the ordering of messages in the view contract. For example, if operation A is required before operation B can be invoked, the request objects are not required to enforce the ordering. At a minimum, in the illustrative implementation, the logic layer can enforce the ordering and return error results if an attempt to invoke an operation is not available in the current state.

It is appreciated that although in the described illustrative implementations, the request objects are not operative to perform message orchestration that such description is merely illustrative as the herein described systems and methods are not limited to deploying such request objects but also can deploy request objects and/or other mechanisms having message orchestration capabilities to realize message orchestration and management within a selected application messaging infrastructure.

In an illustrative implementation and operation, each side of the view contract, i.e., the view layer and the logic layer, can operate to own its own state and exchanges state via "Messages" as found in a selected application messaging architecture. In the illustrative implementation and operation, messages can be operative to capture structure and value (i.e., not focusing on behavior). Illustratively, a message is not considered to be an "object" that responds to messages sent to it. For example, the techniques of using either XML or JSON would be appropriate for capturing the structure and value of messages. If the messaging technique allows object references to be passed, the request object should allow objects that refer to immutable state—that is—the value of the object operatively is not preferably changed by either the sender or the receiver of the message.

Illustratively, the request object can be responsible for performing data serialization in both directions to enforce by-value or immutable semantics. That is, the request object can optionally expose an object oriented interface to the view layer that is more convenient than the underlying message format used for communication on the underlying view contract.

Illustratively, the request object can invoke operations on the view contract in an asynchronous manner. The facility used to accomplish this is not prescribed, but can take advantage of whatever asynchronous invocation facilities are offered, so long as the outgoing operations comprising "Invoke", "Update", or "Request" method can return on the same thread without waiting for a response from the logic layer.

When a response is received from an asynchronous view contract operation, the request object can illustratively operatively marshal the response back to the UI thread. The technique for doing so will depend almost completely on the semantics of the UI system in use. For example, in a WINDOWS®-based system, the message can be posted to the WINDOWS® message queue associated with the same thread used by the calling UI components that requested the operation. In such example, the message would then be dispatched back to that component to handle the "Received" event.

Figure 1:
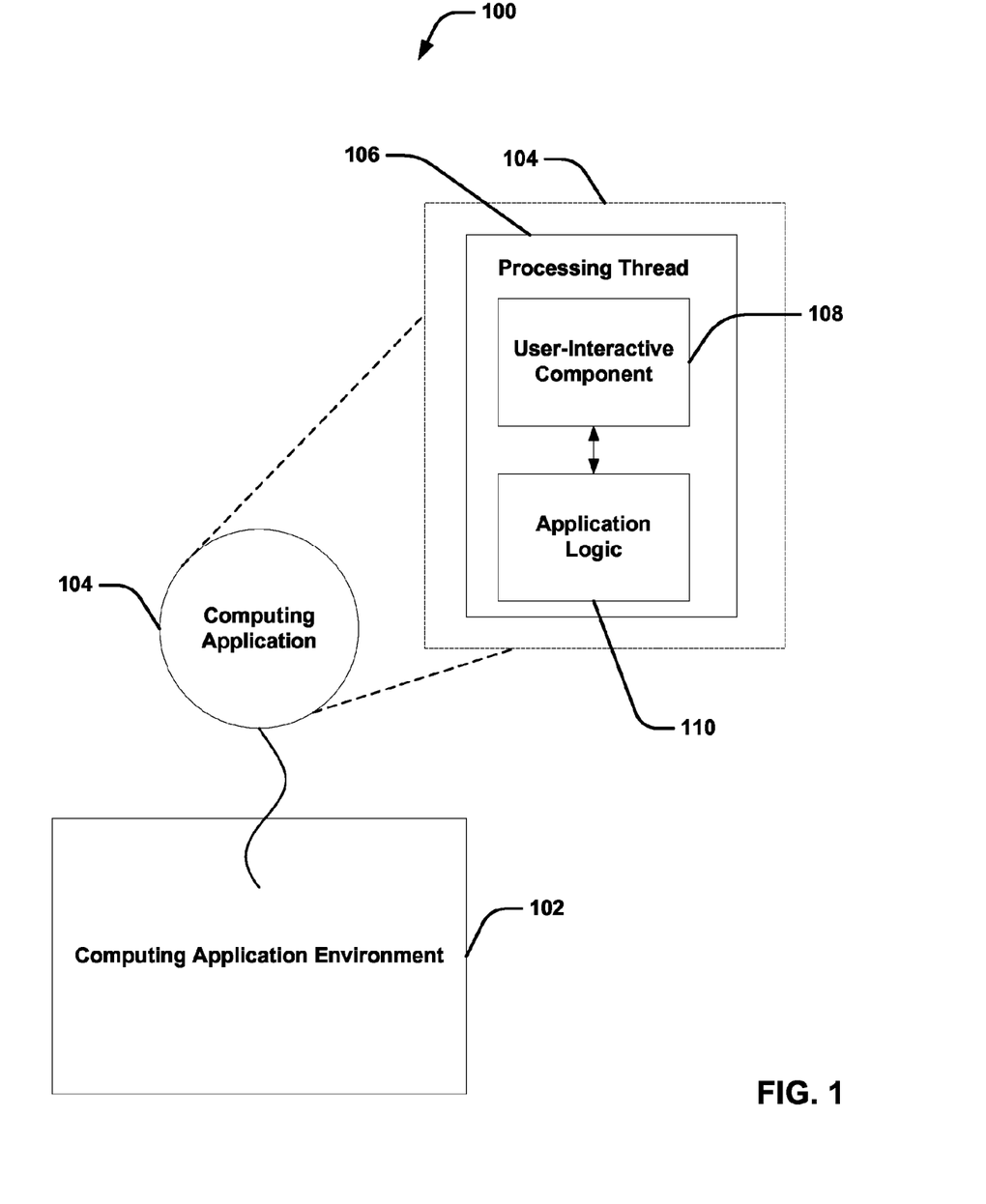
FIG. 1 is a block diagram of one example of a computing application environment having user-interactive components.

User-Interactive Components of a Computing Application:

FIG. 1 describes an exemplary computing environment 100 having non-isolated user-interface (UI) components. As is shown in FIG. 1, computing environment 100 comprises computing application environment 102 executing exemplary computing application 104. In an illustrative implementation, exemplary computing application 104 comprises a processing thread 106 which supports processing from an exemplary user-interactive component 108 and application logic 110. In the illustrative implementation, a request for one or more computing application 104 features/operations can be received by one or more user-interactive components 108 for processing by application logic.

In an illustrative operation, the processing to execute the computing application feature/operation can be performed by application logic 110 operable on processing thread 106 (i.e., the same processing thread) used to process one or more operations/features of one or more user-interactive component 108. In the illustrative operation, being operable on the same processing thread 106, user interactive component 108 can illustratively operate to lock additional features/operations of user-interactive component 108 until the one or more application features/operations is completed processing by application logic 110.

Figure 2:
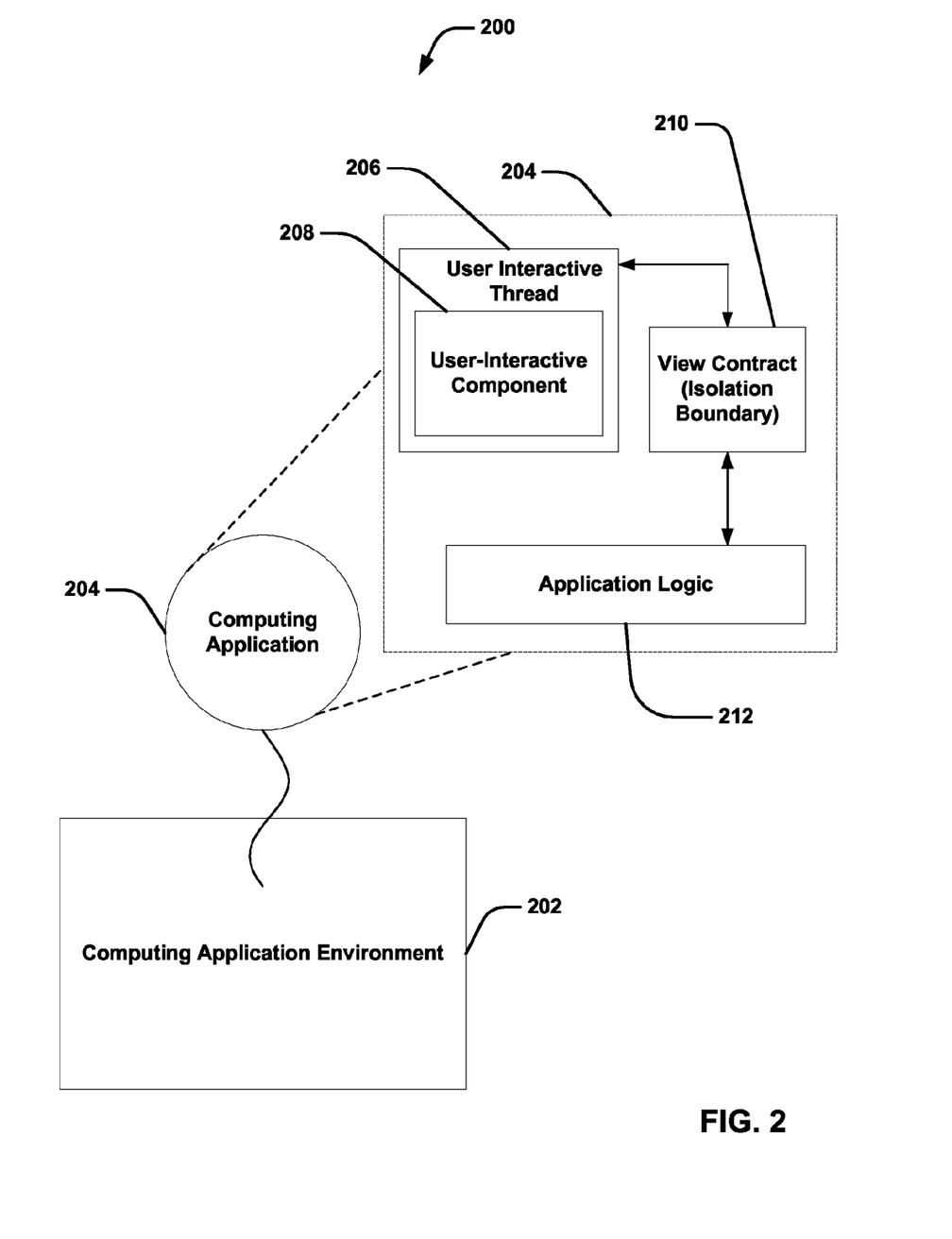
FIG. 2 is a block diagram of one example of a computing application environment deploying an isolated user-interactive component architecture.

FIG. 2 describes an exemplary computing environment 200 having one or more isolated UI components. As is shown in FIG. 2, exemplary computing environment 200 comprises computing application environment 202 operating computing application 204. Further, computing application 204 comprises user-interactive processing thread 206 which processes features and/or operations originating from one or more user-interactive component 208 (e.g., view layer), view contract (e.g., isolation boundary) 210, and application logic (e.g., application layer) 212.

In an illustrative operation, user-interactive component 208 can request the processing of one or more application features (not shown) by application logic 212 through the deployment and execution of one or more view contracts 210. In the illustrative operation, the view contract can comprise one or more mechanisms, as described herein, to ensure asynchronous processing of user-interactive component 208 requests by application logic 212. In an illustrative implementation, the one or more view contracts 210 can comprise parameters and one or more messaging operators operable on a selected messaging architecture of computing application 204.

Figure 3:
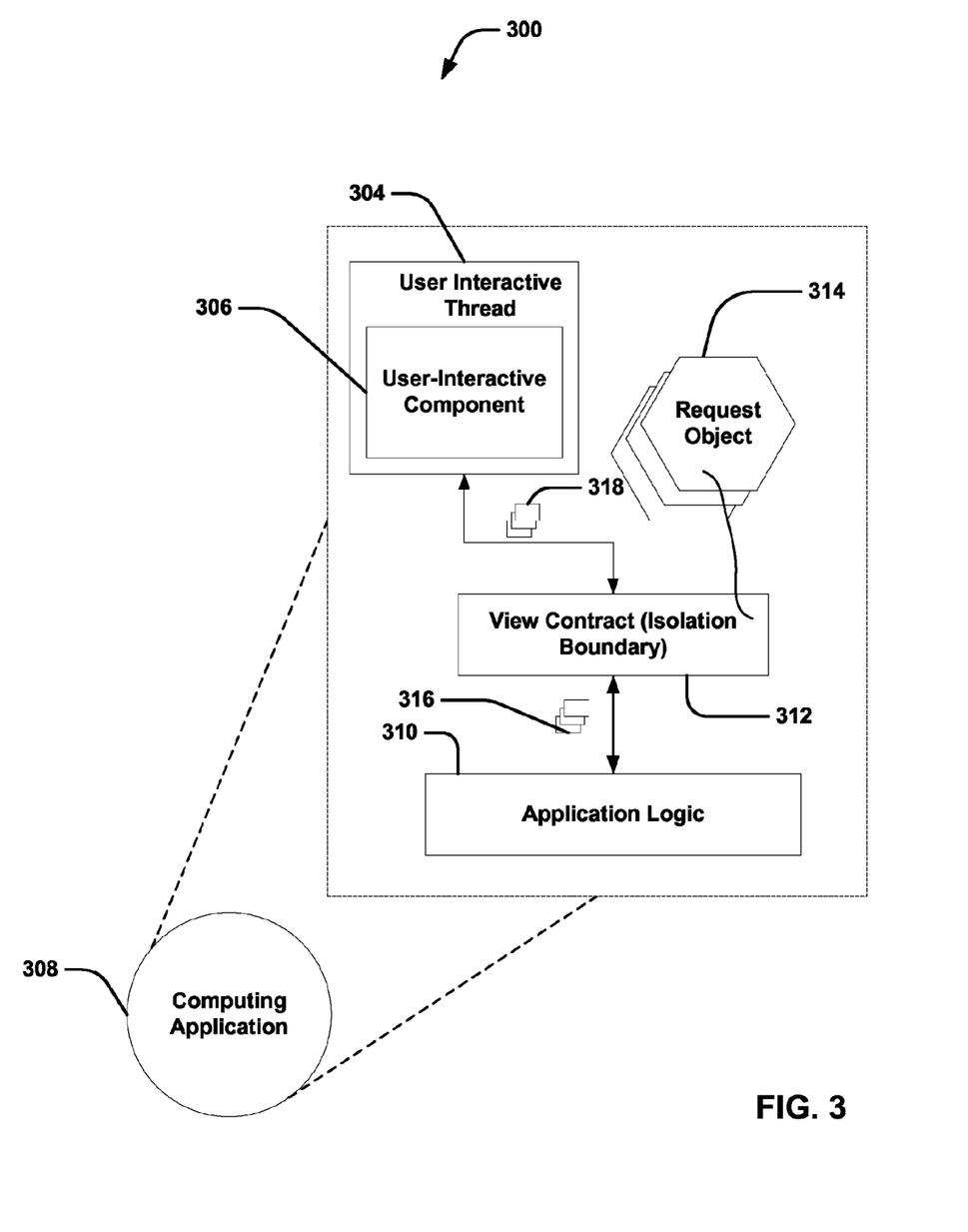
FIG. 3 is a block diagram of one example of the interaction between various components of an exemplary computing application environment deploying an isolated user-interactive components.

FIG. 3 describes an exemplary computing environment 300 having one or more isolated UI components realized through the exemplary deployment of view contracts and request objects. As is shown in FIG. 3, exemplary computing environment 300 comprises computing application 308. Further, computing application 308 comprises user-interactive processing thread 304 which processes features and/or operations originating from one or more user-interactive component 306 (e.g., view layer), view contract (e.g., isolation boundary) 312, one or more request object 314, application logic (e.g., application layer) 310, and messages 316 and 318, respectively.

In an illustrative operation, user-interactive component 306, operating on user-interactive processing thread 306, can request the processing of one or more application features (not shown) by application logic 310 through the deployment and execution of one or more view contracts 312. In the illustrative operation, the view contract can comprise one or more mechanisms, as described herein, to ensure asynchronous processing of user-interactive component 306 requests by application logic 310. In an illustrative implementation, the one or more view contracts 312 can comprise parameters and one or more messaging operators operable on a selected messaging architecture of computing application 204.

In the illustrative implementation, user-interactive component 306 can interact with request object 314 (e.g., a view contract proxy presenting synchronous processing operations) to submit a request for the processing of a computing application operation/feature to application logic 310 (e.g., operating independent of user-interactive processing thread 304) through one or more view contracts 312. Responsive to the request for processing application logic 310 can return state/application information via one or more messages 316 (i.e., as part of a selected messaging architecture (e.g., WINDOWS® messaging pump/queue) provided by computing application 307). Similarly, in the illustrative operation one or messages 318 can be deployed by one or more view contracts 312 to the requesting user-interactive component 306 in line with the selected computing application messaging architecture.

Figure 4:
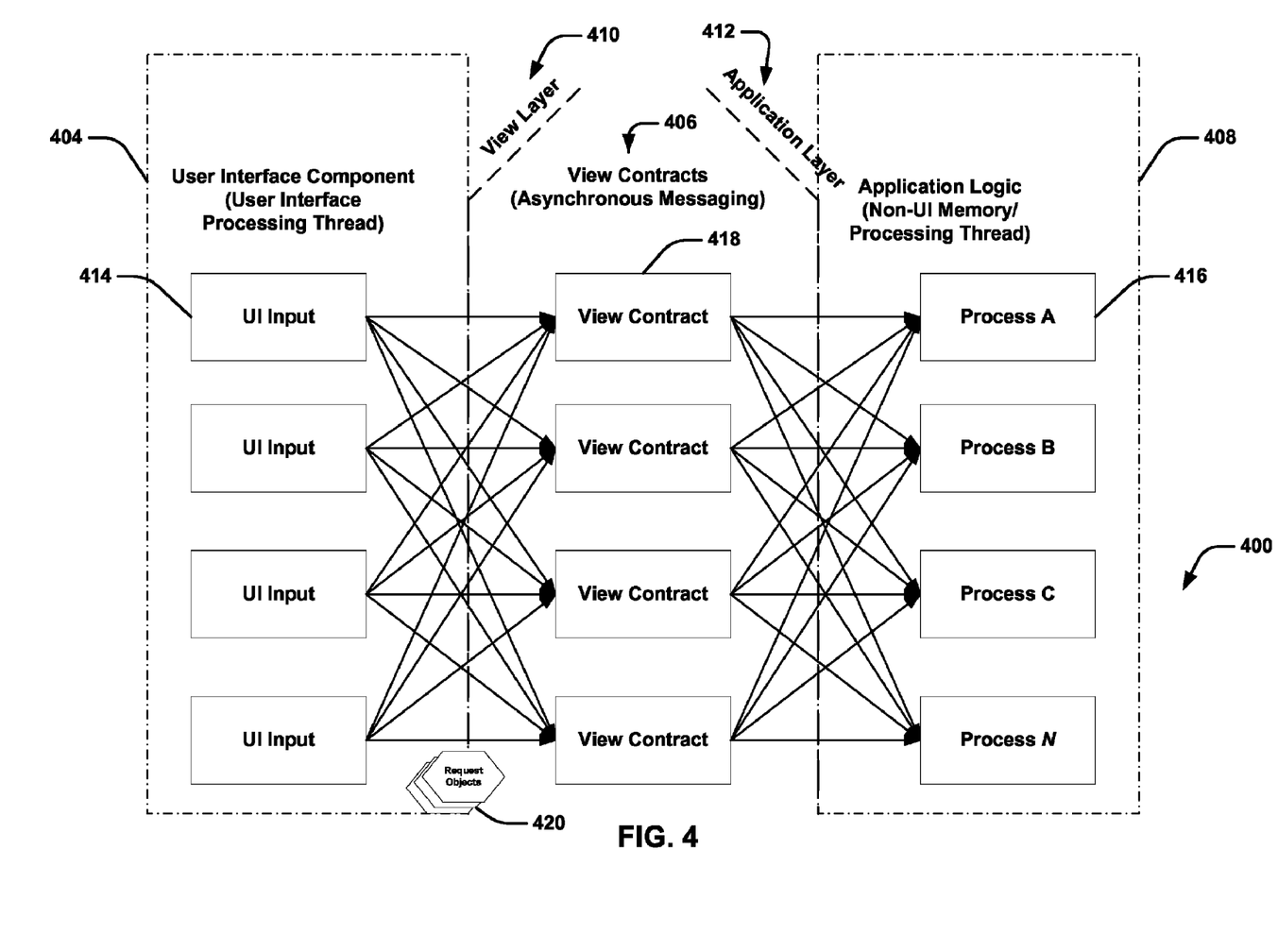
FIG. 4 is a block diagram of one example of an exemplary state encountered by an exemplary computing application environment deploying one or more illustrative isolated user-interactive components.

FIG. 4 schematically illustrates the interaction of exemplary components of an exemplary computing application environment 410 when processing user-interface commands representative of one or more computing application features/operations. As is shown in FIG. 4, exemplary computing application comprises user-interface processing thread 404 (e.g., view layer 410) processing one or more user interface (UI) inputs 414, one or more view contracts 418, one or more request objects 420, and non-UI memory/processing thread 408 (e.g., application layer 412) executing one or more processes (e.g., Process A, Process B, Process C, up to Process N) 416.

In an illustrative operation, one or more UI inputs 414 (e.g., from view layer 410) can request one or more computing application features/operations (e.g., print, open file, etc) to be processed on a non-UI processing/memory thread through the execution of one or more processes 416 (e.g., Process A, Process B, Process C, up to Process N)(e.g., on application layer 412). In the illustrative operation, the request for processing provided by one or more UI components 404 (e.g., UI inputs) can be expressed through the interaction of one or more request objects 420 cooperating with one or more view contracts 418. In the illustrative operation, the one or more view contracts 418 can illustratively operate to asynchronously deploy and manage the requests for processing to one or more processes 416 executing on non-UI processing/memory thread 408. In the illustrative operation, the asynchronous deployment and management of processing to the non-UI memory/processing thread 408 allows an exemplary user interface (not shown) of exemplary computing application 400 to receive and process numerous user inputs for processing by processes 416 thereby reducing processing performed on UI processing thread 404 and reducing opportunities for the computing application to lock while processing the numerous user inputs.

It is appreciated that the one-to-many relationships between user inputs 414, view contracts 418, and processes 416 as described in FIG. 4 is merely illustrative as the herein described systems and methods contemplate one-to-one operative deployments between user inputs 414, view contracts 418, and processes 416.

Figure 5:
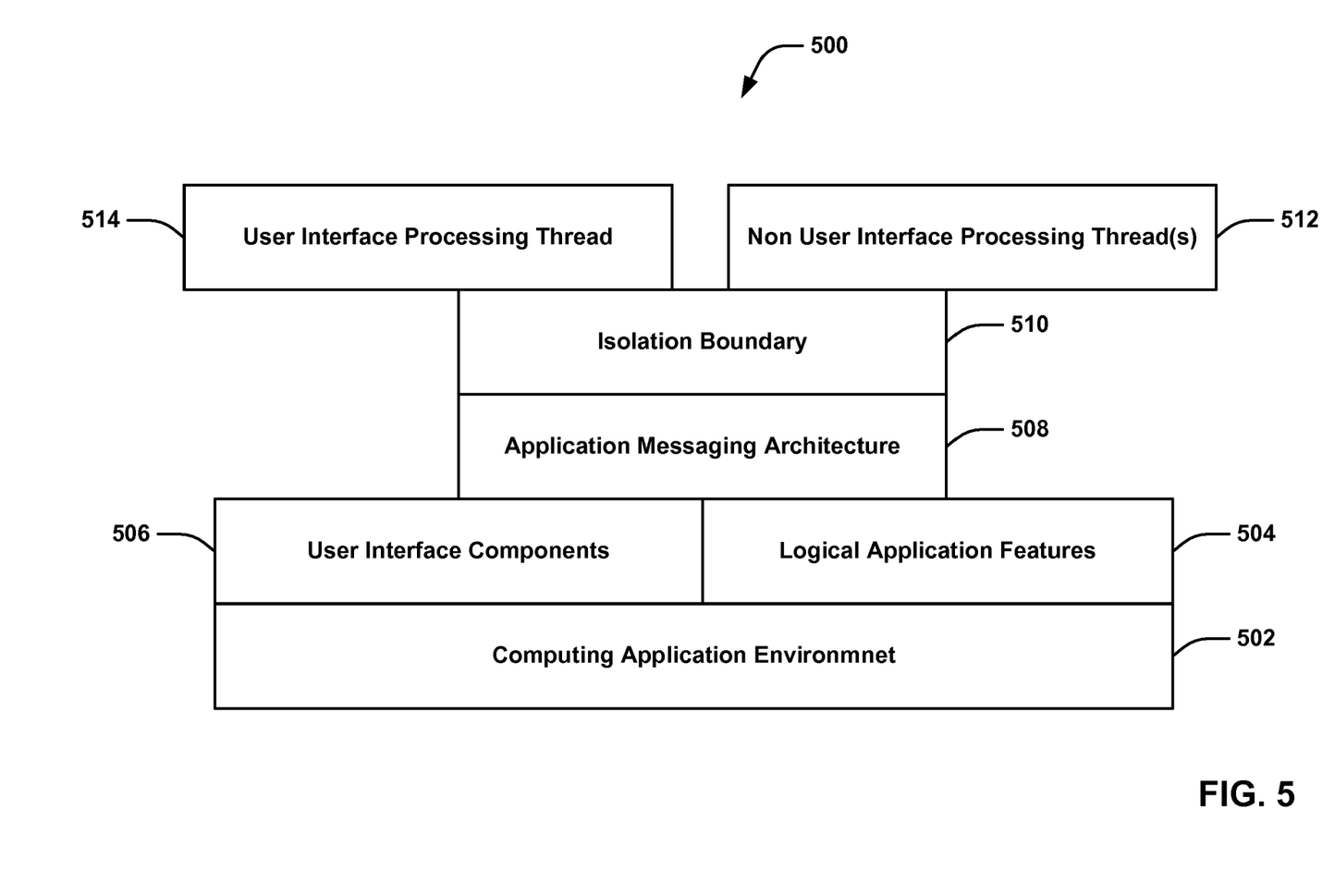
FIG. 5 is a block diagram of one example of a system for processing messages for isolated user-interactive components.

FIG. 5 schematically illustrates the various cooperating components of an exemplary computing environment that facilitates the isolation of user-interactive component processing. As is shown in FIG. 5, exemplary computing environment 500 comprises computing application environment 502. Operating within computing application environment 504 are user interface components 506 and logical application features 504. User interface components 506 and logical application features 504 illustratively operate to communicate data and state using application messaging architecture 510. Specifically, user interface components 506 can execute user-interaction on user interface processing thread 514 and application features on non-user interface processing thread(s) 512. In the illustrative operation, one or more user interface components 506 can request the execution of one or more logical application features 504 by communicating to one or more non-user interface processing thread(s) 512 using application messaging architecture 508. Operatively isolation boundary 510 can operate to ensure that non-user-interface processing is asynchronously processed by one or more processes executing on one or more non-user interface processing thread(s) 512. Illustratively isolation boundary 510 can comprise one or more view contracts and/or request objects.

The systems described above can be implemented in whole or in part by electromagnetic signals. These manufactured signals can be of any suitable type and can be conveyed on any type of network. For instance, the systems can be implemented by electronic signals propagating on electronic networks, such as the Internet. Wireless communications techniques and infrastructures also can be utilized to implement the systems.

Figure 6:
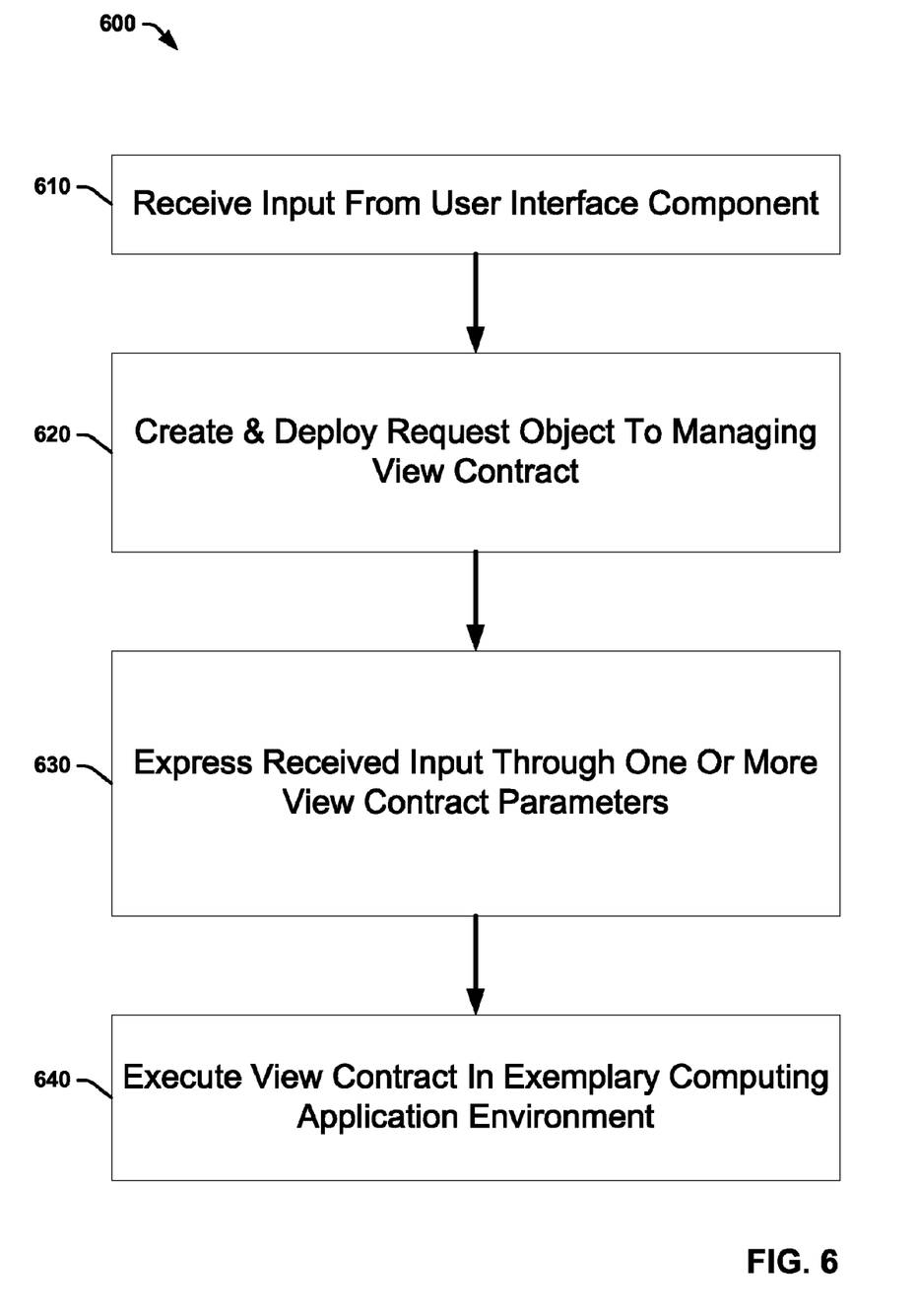
FIG. 6 is a flow diagram of one example of a method for isolating user-interactive components.

FIG. 6 is a flow diagram of one example of a method 600 illustratively deployed to process user interactions in an exemplary computing application environment. Input is received from a user-interface component at block 610. Responsive to the user-interface component request a request object (acting as a proxy to a view contract) is created and deployed to one or more managing view contracts at block 620. The received input is then expressed as one or more view contract parameters at block 630. The view contract is then executed in the exemplary computing application environment at block 640.

Figure 7:
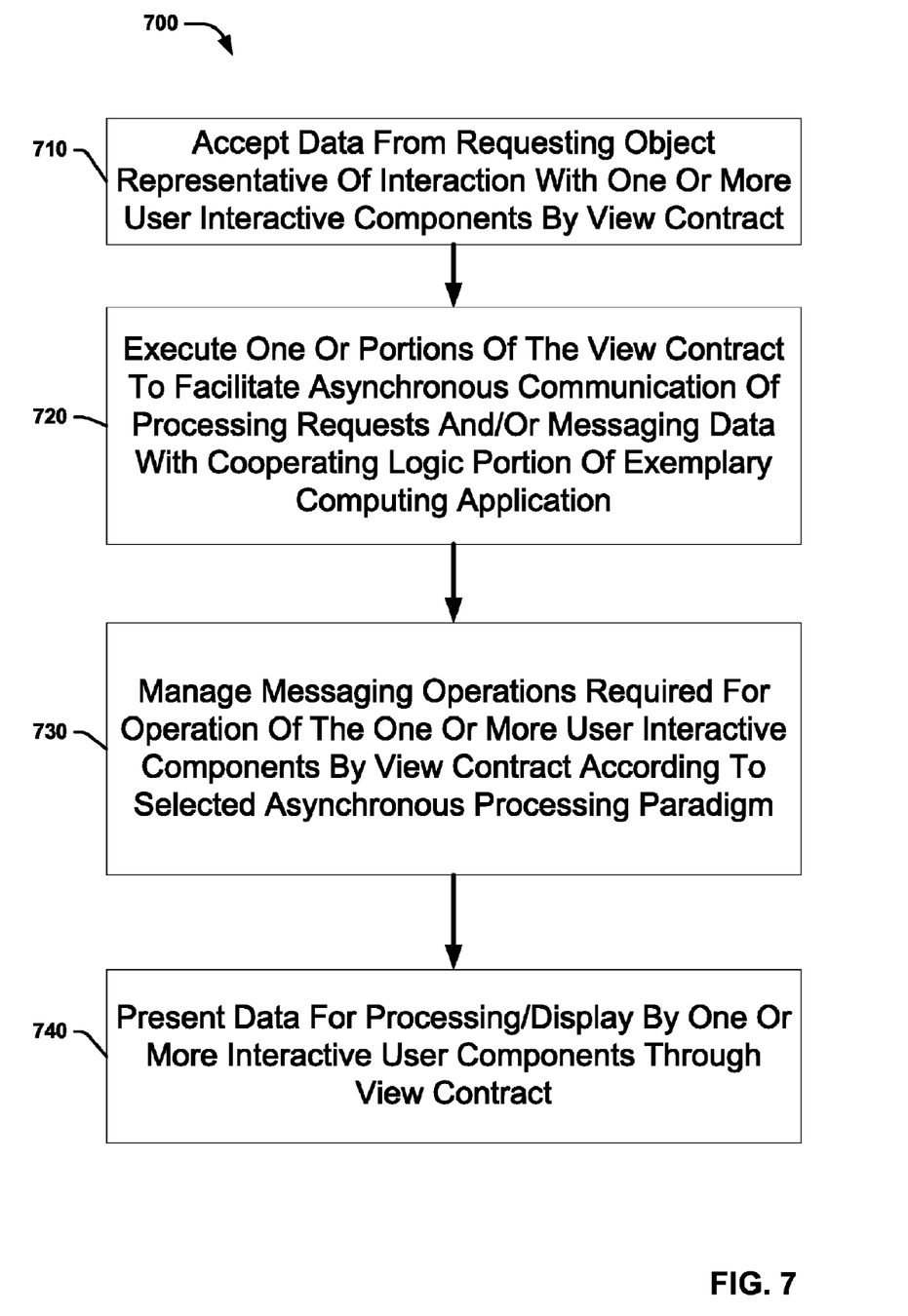
FIG. 7 is a flow diagram of one example of a method for creating a view contract for execution in an exemplary computing environment having isolated user-interactive components.

FIG. 7 is a flow diagram of one example of a method 700 illustratively deployed to execute a view contract as part of one or more operations to facilitate the isolation of one or more user-interface components in an exemplary computing application environment. Data from a requesting object representative of an interaction with one or more user-interactive components is accepted at block 710 by a view contract. One or more portions of the view contract is then executed at block 720 to facilitate asynchronous communication of processing requests and/or messaging data with cooperating logic portion(s) of an exemplary computing application. Resulting messaging operations required for the operation of the one or more user-interactive components is then managed by the view contract at block 730 according to a selected asynchronous processing paradigm. Data is then presented at block 740 for processing/display by one or more interactive user components through the view contract.

Figure 8:
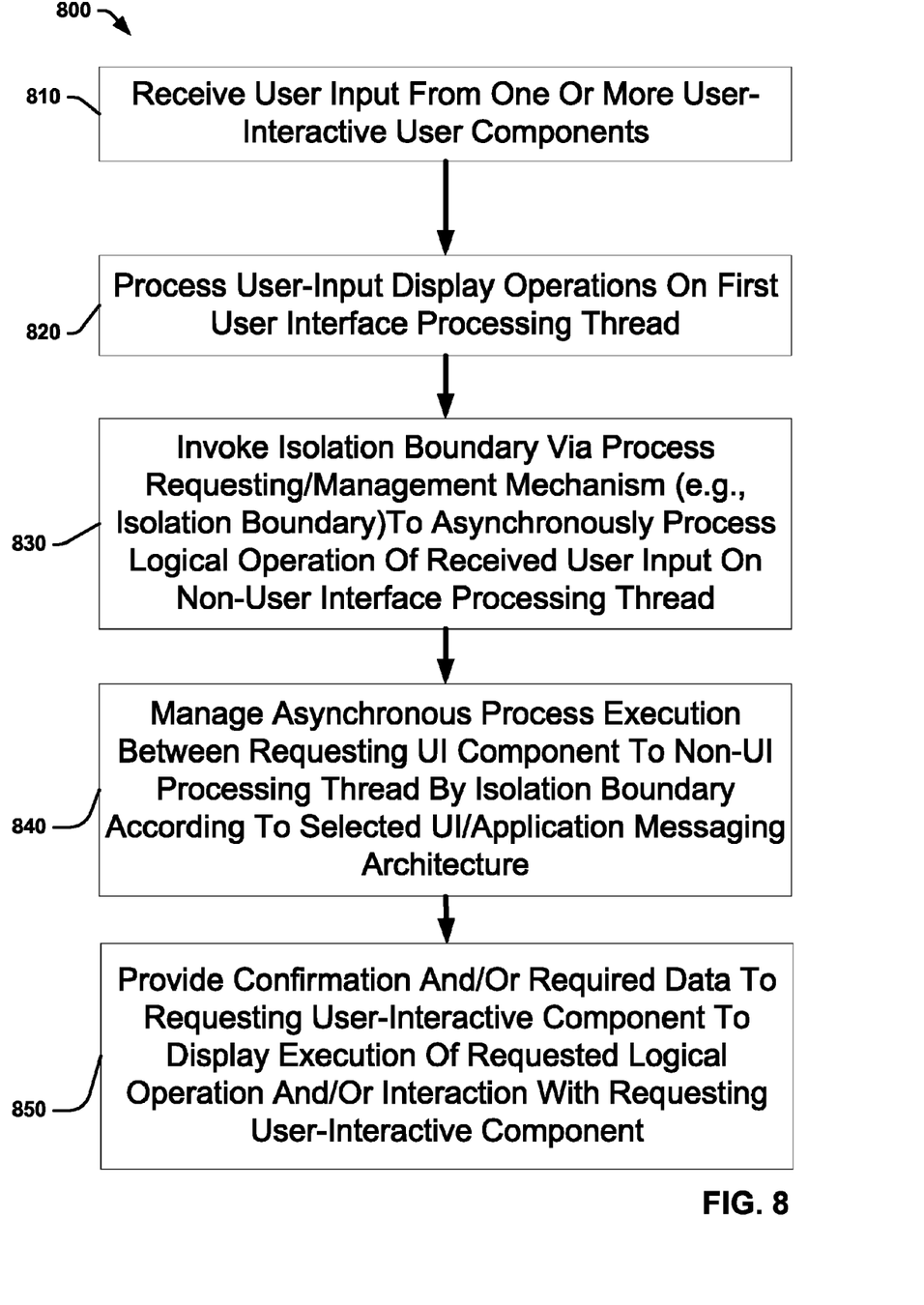
FIG. 8 is a flow diagram of one example of a method for the processing performed to execute one or more operations/features of an exemplary computing environment deploying isolated user-interactive components.

FIG. 8 is a flow diagram of one example of a method 800 for offloading processing from a user-interface processing thread to cooperating one or more non-user-interface processing threads. User input is received from one or more user-interactive user components at block 810. The user-input display/control operations are then processed at block 820 using a first user-interface processing thread. An isolation boundary is then invoked at block 830 through a process requesting/management mechanism (e.g., isolation boundary—view contract) to asynchronously process logical operations of the received user input on a non-user-interface processing thread. The asynchronous process execution is then managed by, for example, a process requesting/management mechanism (e.g., view contract) between a requesting UI component to a non-UI processing thread according to a selected UI/application messaging architecture paradigm at block 840. Confirmation and/or required data is then provided at block 850 to the requesting UI component to display execution of requested logical operation and/or interaction with requesting user-interactive component.

The methods can be implemented by computer-executable instructions stored on one or more computer-readable media or conveyed by a signal of any suitable type. The methods can be implemented at least in part manually. The steps of the methods can be implemented by software or combinations of software and hardware and in any of the ways described above. The computer-executable instructions can be the same process executing on a single or a plurality of microprocessors or multiple processes executing on a single or a plurality of microprocessors. The methods can be repeated any number of times as needed and the steps of the methods can be performed in any suitable order.

The subject matter described herein can operate in the general context of computer-executable instructions, such as program modules, executed by one or more components. Generally, program modules include routines, programs, objects, data structures, etc., that perform particular tasks or implement particular abstract data types. Typically, the functionality of the program modules can be combined or distributed as desired. Although the description above relates generally to computer-executable instructions of a computer program that runs on a computer and/or computers, the user interfaces, methods and systems also can be implemented in combination with other program modules. Generally, program modules include routines, programs, components, data structures, etc. that perform particular tasks and/or implement particular abstract data types.

Moreover, the subject matter described herein can be practiced with most any suitable computer system configurations, including single-processor or multiprocessor computer systems, mini-computing devices, mainframe computers, personal computers, stand-alone computers, hand-held computing devices, wearable computing devices, microprocessor-based or programmable consumer electronics, and the like as well as distributed computing environments in which tasks are performed by remote processing devices that are linked through a communications network. In a distributed computing environment, program modules can be located in both local and remote memory storage devices. The methods and systems described herein can be embodied on a computer-readable medium having computer-executable instructions as well as signals (e.g., electronic signals) manufactured to transmit such information, for instance, on a network.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing some of the claims.

It is, of course, not possible to describe every conceivable combination of components or methodologies that fall within the claimed subject matter, and many further combinations and permutations of the subject matter are possible. While a particular feature may have been disclosed with respect to only one of several implementations, such feature can be combined with one or more other features of the other implementations of the subject matter as may be desired and advantageous for any given or particular application.

Moreover, it is to be appreciated that various aspects as described herein can be implemented on portable computing devices (e.g., field medical device), and other aspects can be implemented across distributed computing platforms (e.g., remote medicine, or research applications). Likewise, various aspects as described herein can be implemented as a set of services (e.g., modeling, predicting, analytics, etc.).

Figure 9:
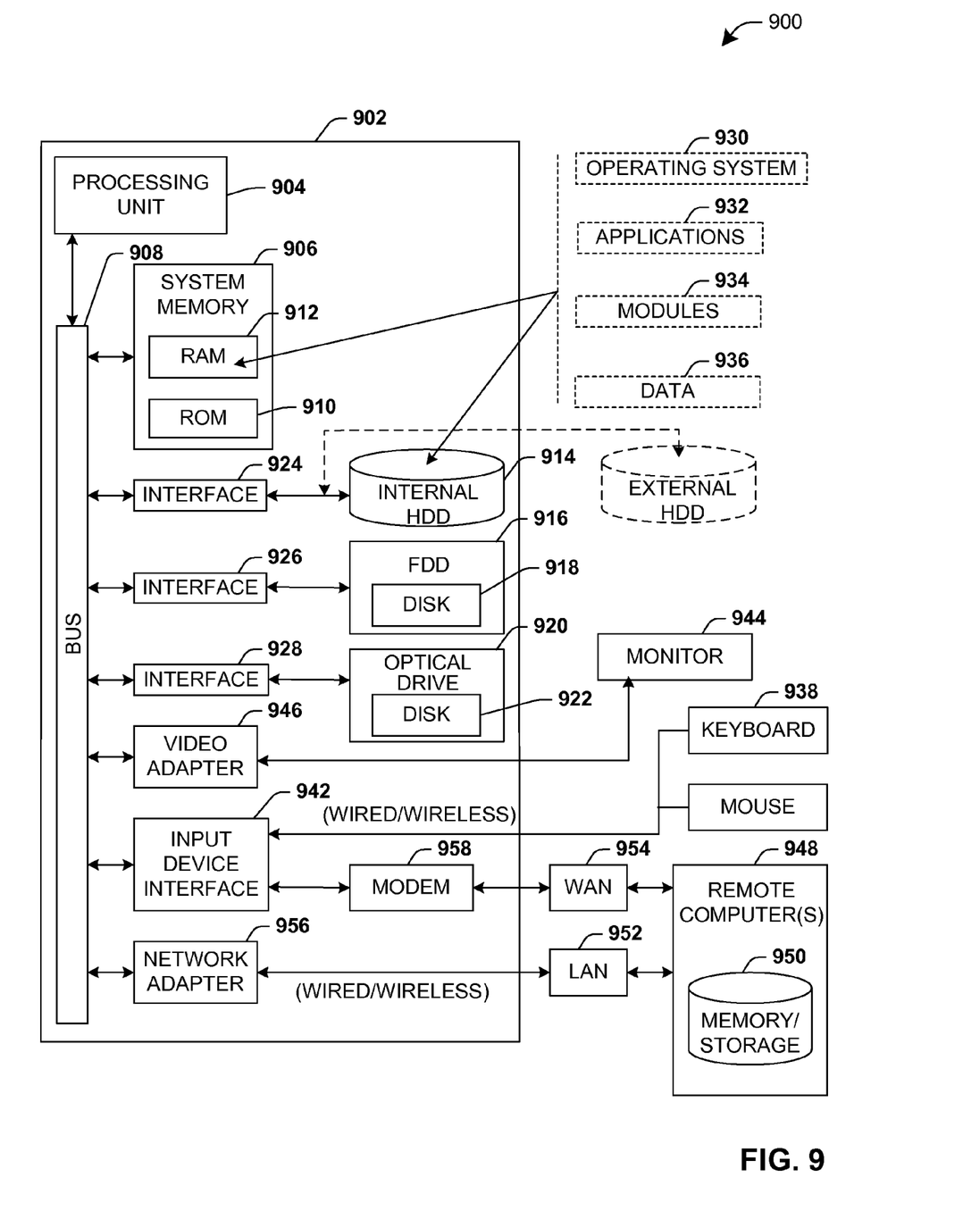
FIG. 9 is an example computing environment in accordance with various aspects described herein.

FIG. 9 illustrates a block diagram of a computer operable to execute the disclosed architecture. In order to provide additional context for various aspects of the subject specification, FIG. 9 and the following discussion are intended to provide a brief, general description of a suitable computing environment 900 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

More particularly, and referring to FIG. 9, an example environment 900 for implementing various aspects as described in the specification includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the specification can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are example and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
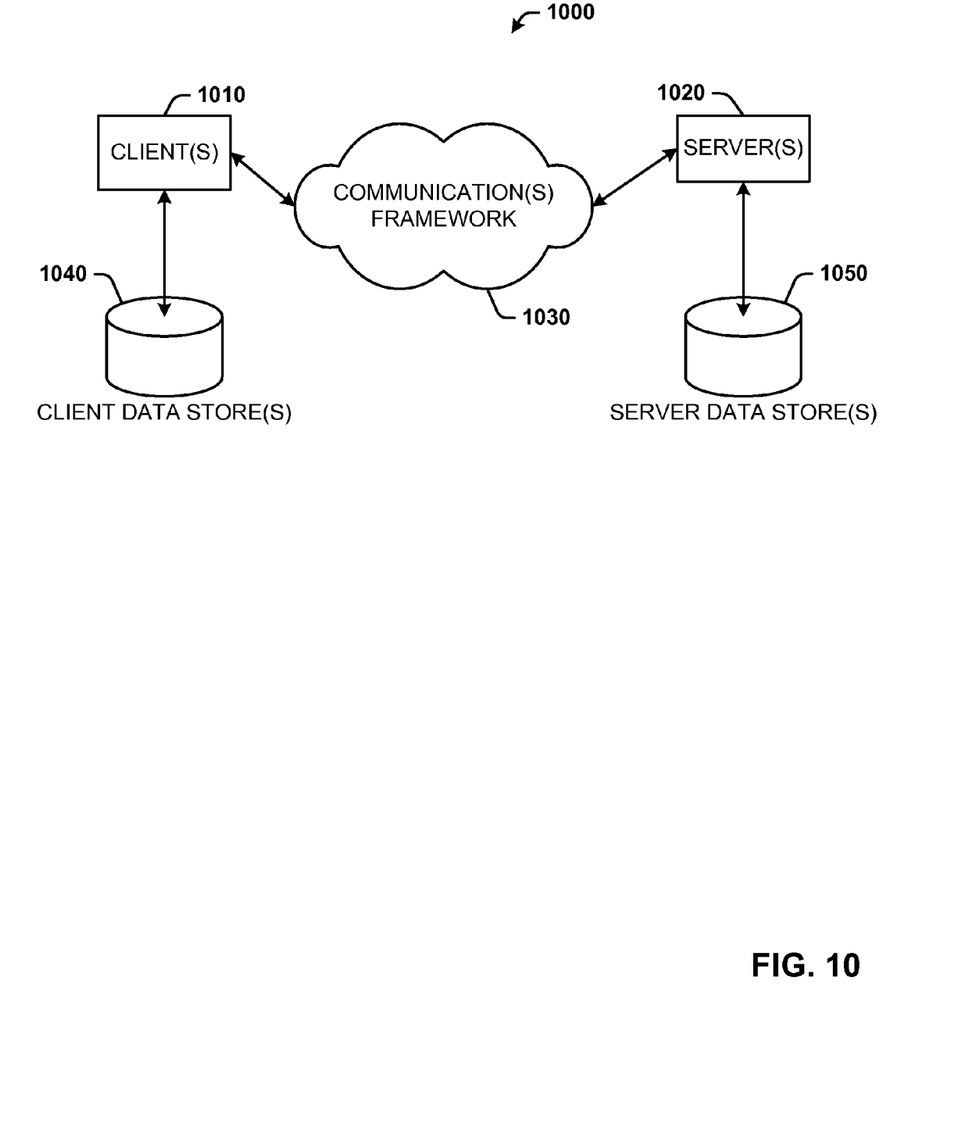
FIG. 10 is an example networked computing environment in accordance with various aspects described herein.

Referring now to FIG. 10, there is illustrated a schematic block diagram of an exemplary computing environment 1000 in accordance with the subject invention. The system 1000 includes one or more client(s) 1010. The client(s) 1010 can be hardware and/or software (e.g., threads, processes, computing devices). The client(s) 1010 can house cookie(s) and/or associated contextual information by employing the subject invention, for example. The system 1000 also includes one or more server(s) 1020. The server(s) 1020 can also be hardware and/or software (e.g., threads, processes, computing devices). The servers 1020 can house threads to perform transformations by employing the subject methods and/or systems for example. One possible communication between a client 1010 and a server 1020 can be in the form of a data packet adapted to be transmitted between two or more computer processes. The data packet may include a cookie and/or associated contextual information, for example. The system 1000 includes a communication framework 1030 (e.g., a global communication network such as the Internet) that can be employed to facilitate communications between the client(s) 1010 and the server(s) 1020.

Communications can be facilitated via a wired (including optical fiber) and/or wireless technology. The client(s) 1010 are operatively connected to one or more client data store(s) 1040 that can be employed to store information local to the client(s) 1010 (e.g., cookie(s) and/or associated contextual information). Similarly, the server(s) 1020 are operatively connected to one or more server data store(s) 1050 that can be employed to store information local to the servers 1020.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. In a multi-threaded architecture implemented at a computing system having one or more processors, a method for processing requests for application logic processing originating from user-interactive components in the multi-threaded architecture, the method comprising:
   the computer system executing a first thread, the first thread comprising a user-interface thread that executes one or more user-interactive components;
   the computer system executing a second thread, the second thread comprising a non-user-interface thread that asynchronously executes one or more application logic processes for the one or more user-interactive components;
   the computer system providing an isolation boundary between the user-interface thread and the non-user-interface thread, the isolation boundary comprising an asynchronous view contract, the asynchronous view contract being configured to provide one or more request objects that facilitate communications between the one or more user-interactive components executing on the user-interface thread and the one or more application logic processes executing on the non-user-interface thread;
   receiving, at the isolation boundary, a request from the one or more user-interactive components executing on the user-interface thread, the request expressed through the one or more request objects;
   based on receiving the request, updating control data at the isolation boundary to facilitate asynchronous processing of the request by the one or more application logic processes executing on the non-user-interface thread;
   detecting, at the non-user-interface thread, a condition of the control data to generate application logic processing state data;
   providing the application logic processing state data to the one or more user-interactive components as expressed by the one or more request objects; and
   correlating messages by the view contract sent by the one or more user-interactive components.

2. The method as recited in claim 1, further comprising: synchronizing the data between both sides of the view contract.

3. The method as recited in claim 1 further comprising:
asynchronous invocation of the one or more application logic processes by the one or more user-interactive components.

4. A computer-readable storage device having stored thereon computer executable instructions which when executed by one or more processors of a computer system, cause the computer system to implement a method for processing requests for application logic processing originating from user-interactive components in a multi-threaded architecture, the method comprising:
- executing a first thread at the computer system, the first thread comprising a user-interface thread that executes one or more user-interactive components;
- executing a second thread at the computer system, the second thread comprising a non-user-interface thread that asynchronously executes one or more application logic processes for the one or more user-interactive components;
- providing an isolation boundary between the user-interface thread and the non-user-interface thread at the computer system, the isolation boundary comprising an asynchronous view contract, the asynchronous view contract being configured to provide one or more request objects that facilitate communications between the one or more user-interactive components executing on the user-interface thread and the one or more application logic processes executing on the non-user-interface thread;
- receiving, at the isolation boundary, a request from the one or more user-interactive components executing on the user-interface thread, the request expressed through the one or more request objects and, based on the request, updating control data at the isolation boundary to facilitate asynchronous processing of the request by the one or more application logic processes executing on the non-user-interface thread;
- detecting, at the non-user-interface thread, a condition of the control data to generate application logic processing state data; and
- providing the application logic processing state data to the one or more user-interactive components as expressed by the one or more request objects; and
- correlating messages by the view contract sent by the one or more user-interactive components.

5. A computer system, comprising:
one or more processors;
one or more computer computer-readable storage media storing computer-executable instructions which, when executed by the one or more processors, are configured to implement a method for processing requests for application logic processing originating from user-interactive components in a multi-threaded architecture, including the following:
- instantiating a first thread at the computer system, the first thread comprising a user-interface thread that executes one or more user-interactive components;
- instantiating a second thread at the computer system, the second thread comprising a non-user-interface thread that asynchronously executes one or more application logic processes for the one or more user-interactive components;
- enforcing an isolation boundary between the user-interface thread and the non-user-interface thread at the computer system, the isolation boundary comprising an asynchronous view contract, the asynchronous view contract being configured to provide one or more request objects that facilitate communications between the one or more user-interactive components executing on the user-interface thread and the one or more application logic processes executing on the non-user-interface thread;
- receiving, at the isolation boundary, a request from the one or more user-interactive components executing on the user-interface thread, the request expressed through the one or more request objects and, based on the request, updating control data at the isolation boundary to facilitate asynchronous processing of the request by the one or more application logic processes executing on the non-user-interface thread;
- detecting, at the non-user-interface thread, a condition of the control data to generate application logic processing state data;
- providing the application logic processing state data to the one or more user-interactive components as expressed by the one or more request objects; and
- correlating messages by the view contract sent by the one or more user-interactive components.

\* \* \* \* \*